Dec. 27, 1949     W. C. HASSELHORN     2,492,220
HEAT TREATING FURNACE
Filed July 16, 1945
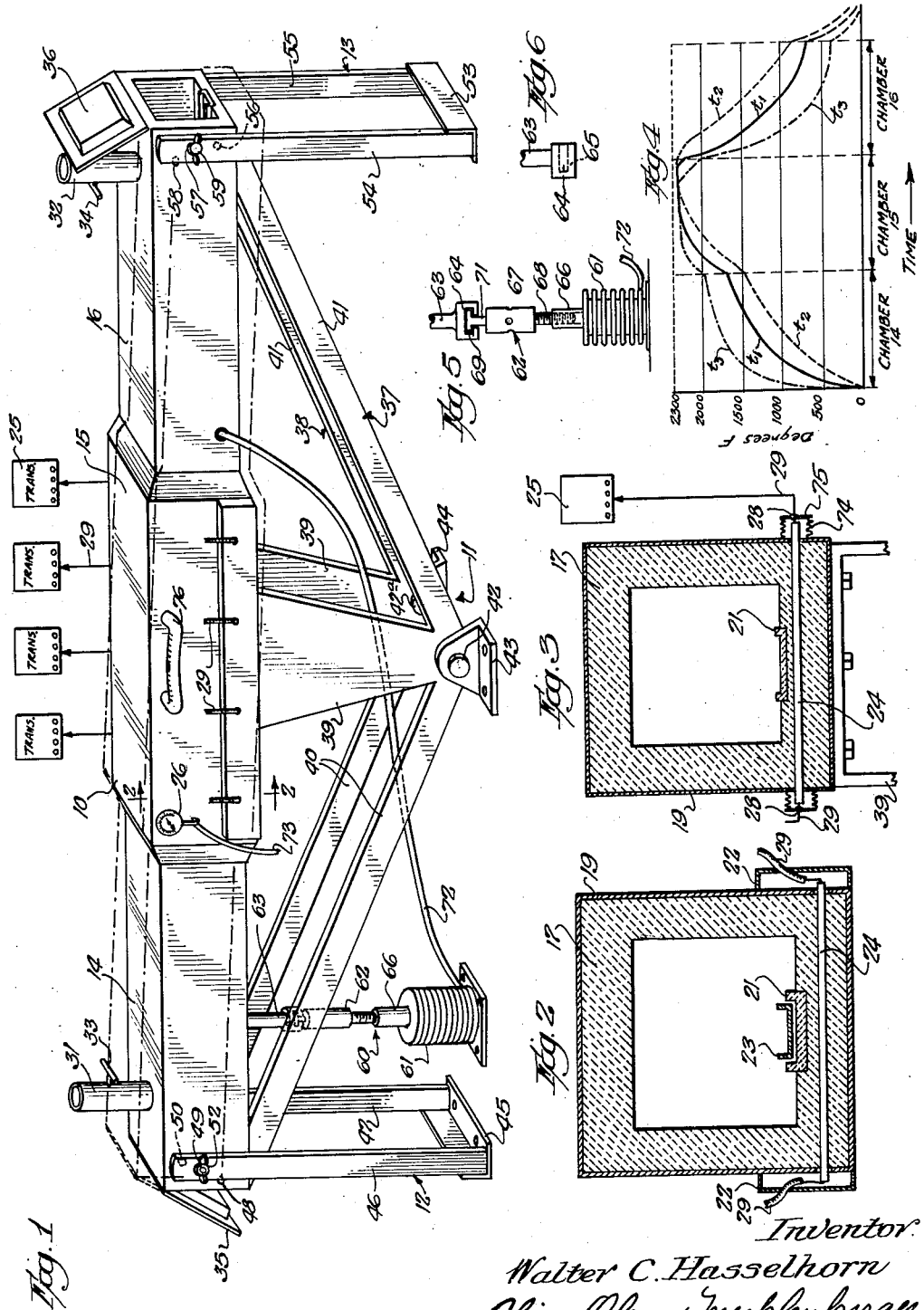
Inventor
Walter C. Hasselhorn Patented Dec. 27, 1949

2,492,220

UNITED STATES PATENT OFFICE 2,492,220

HEAT-TREATING FURNACE

Walter C. Hasselhorn, Chicago, Ill., assignor to Cook Electric Company, Chicago, Ill., a corporation of Illinois Application July 16, 1945, Serial No. 605,373

15 Claims. (Cl. 263—2)

This application relates to heat treating apparatus and temperature control means therefor, more particularly to heat treating apparatus having a preheating stage, a heat-holding stage and a cooling stage, and means for varying the rate of heating in the preheating stage and the rate of cooling in the cooling stage, and it is an object of the invention to provide improved heat treating apparatus and temperature controlling means therefor of the character indicated.

It is a further object of the invention to provide an improved heat treating furnace in which the temperature gradient may be varied.

It is a further object of the invention to provide an improved method of varying the temperature distribution in a furnace.

It is a further object of the invention to provide an improved furnace wherein the temperature distribution may be varied in a simple and easy manner.

It is a further object of the invention to provide an improved furnace wherein a plurality of stages of heat treatment may be obtained.

In the heat treatment of certain articles such as some forms of ceramics, it is necessary to have a cycle of temperature variations, such for example as a cycle including a preheating phase, a heat-holding phase, and a cooling phase. Moreover, it is desirable that there be a correlation between the various phases of the heat treating cycle. That is to say it may be desirable to have a rapid rate of preheating with a rapid rate of cooling, or a slow rate of preheating with a slow rate of cooling. Additionally, it is desirable that the rate of preheating and the rate of cooling be variable within the same furnace so that there may be rapid preheating as well as slow preheating along with correlated cooling phases without providing a plurality of furnaces.

Apparatus for heat treating articles, whereby the described heat treating cycle is obtained, may of course include three or more separate furnaces in each of which a certain portion of the heat treating cycle is carried on. Thus there may be a preheating furnace, a heat holding furnace, and a cooling furnace. In each of these separate furnaces heating means as well as heat or temperature controlling means must be provided in order to give the desired properties in the finished articles. This results in an undue use of valuable space to accommodate the three furnaces. It further requires a considerable amount of control equipment, particularly where it is necessary to provide a correlation between the preheating rate and the cooling rate. It also is necessary, in an arrangement of this character, to remove the articles from one furnace, transport them to a second furnace, and then remove them from the second furnace and transfer them to the third furnace. Heat is lost from the articles during transit, with the consequent possibility of poor properties in the final product.

Accordingly, it is a further object of the invention to provide an improved heat treating furnace in which the complete cycle of operation, preheating, heat-holding, and cooling, is carried on within the same furnace.

In carrying out the invention in one form, heat treating apparatus is provided comprising an elongated chamber having a normal position. Heating means are associated with the chamber centrally thereof for maintaining a temperature distribution therein, and in order to vary the temperature distribution throughout the elongated chamber the chamber is pivoted so that it may be displaced from its normal position. More particularly, the heat treating furnace includes an elongated chamber having a preheating portion, a heat-holding portion, and a cooling portion. Heating means are associated with the chamber in the heat-holding portion thereof for maintaining the temperature distribution therein. The elongated chamber is pivotally mounted whereby it may be displaced from a normal position, and inlet and outlet means are provided adjacent each end of the chamber whereby convection currents of air may pass therethrough when the chamber is displaced from its normal position.

For a more complete understanding of the invention, reference should now be had to the accompanying drawing in which:

Figure 1 is a perspective view of a furnace embodying the invention;

Fig. 2 is a somewhat enlarged sectional view taken substantially along the line 2—2 of Fig. 1;

Fig. 3 is a similar sectional view of a modified form of the invention;

Fig. 4 is a diagrammatic representation of heat-treating cycles obtainable with the furnace shown in Figs. 1 and 3;

Fig. 5 is an enlarged fragmentary view of a portion of Fig. 1, and

Fig. 6 is a side view of one element shown in Fig. 5.

Referring more particularly to the drawing, the invention is shown embodied in a furnace having an elongated chamber 10, pivotal supporting means 11 for the elongated chamber, and the frames 12 and 13 at the ends of the chamber for holding it in any desired position.

The elongated chamber 10 is divided into three different portions or treating chambers 14, 15 and 16, consecutively arranged so that an article in passing through the furnace moves from the chamber 14, through the chamber 15, and thereafter through the chamber 16. The chambers 14, 15 and 16 may be constructed in any well known manner and may, for example, include a layer 17 of refractory material such as fire clay, for example, which will withstand temperatures over 2300 degrees Fahrenheit and a supporting metallic shell 19. The thickness of the layer of refractory material 17 is sufficient so that substantially none of the heat is transferred to the atmosphere through the furnace walls. The cross section of the chambers 14, 15 and 16 may be of any size to be able to accommodate articles to be treated, and arranged within these chambers is a flanged ceramic runway or track 21 upon which trays 23 transporting the articles to be treated move through the furnace. The runway 23 may be made of firebrick having a highly smooth surface so that the trays 23 may be easily pushed therealong. In the operation of the furnace an attendant may push loaded trays through the furnace by using a metal push rod. The length of the chambers 14, 15 and 16 may vary and is dependent upon the range of temperature variation desired.

In one form of the invention, heat may be supplied to the central portion 15 of the furnace by means of the carbon resistance rods 24 embedded within the refractory material 17. The carbon rods extend outwardly from each side of the chamber 15 and are connected by conductors 29 to transformers 25 for supplying electrical current to the resistors. The transformers 25 are of a conventional character and may, for example, be tap-changing transformers, whereby the voltage supplied to the carbon rods is variable to adjust the maximum temperature within the chamber 15 as is well understood. Since the refractory material 17 is also electrically insulating, the carbon rods are embedded therein without the provision of any further electrical insulation. The metallic layer 19 has suitable openings provided therein through which the carbon rods 24 extend, and, to insulate the ends of the carbon rods from the surroundings, covers 22 are attached in any suitable way to shell 19. Openings as shown are provided in the covers 22 through which the insulated conductors 29 pass from the transformers 25 before being attached to the carbon rods. The chambers 14 and 16 may not be provided with heat-supplying or generating means so that they will derive their heat through heat transfer from the chamber 15. The refractory layer 17 in the chamber 15 of course is heated to a high temperature by the carbon rods 24, and through the processes of heat radiation and convection, as well as by conduction, the chambers 14 and 16 will be maintained at a certain temperature and with a certain temperature distribution. The invention is not to be limited to heat generation solely within chamber 15 because it is obvious that the novelty of the structure herein disclosed is also applicable in certain instance to providing some heat generation in either or both of chambers 14 and 16 as well as in chamber 15.

A pyrometer 26 is mounted on the exterior of the chamber 15 to give an indication of the temperature therein so that an attendant in charge of the furnace may, by varying the taps on the transformers, keep the temperature in the furnace within desired limits.

Adjacent the outer ends of the chambers 14 and 16, respectively, are the vents 31 and 32, whereby air or other gases may circulate through the furnace chamber. The vents 31 and 32 include dampers 33 and 34, respectively, by means of which the amount of air or gas circulating through the furnace may be controlled or it may be shut off altogether. In order that the furnace chamber may be completely closed during the time that the heat-treating cycle is being carried out, the door 35 is hinged or otherwise attached to the preheating chamber 14 to close this chamber, and the door 36 is similarly attached to the cooling chamber 16 to close this chamber.

In the normal operation of the furnace the doors 35 and 36 are closed and power is supplied to the carbon rods 24 through transformers 25, as described. While carbon rods have been shown only in the bottom of the chamber 15, it will be apparent to those skilled in this art that similar rods may be arranged at the top of the chamber 15 as well as along the sides thereof if this is necessary to produce a temperature or a capacity that is desired. The carbon rods 24 being associated with the chamber 15, this chamber will reach some maximum temperature, for example 2300 degrees Fahrenheit, which is substantially constant throughout the chamber, (adjacent the junctions with chambers 14 and 16 the temperature in chamber 15 is less than the maximum due to the fact that chambers 14 and 16 are below the temperature of chamber 15 and thus heat is being transferred to chambers 14 and 16) and through the processes of radiation, conduction and convection, each of the chambers 14 and 16 acquires a certain temperature gradient.

Since the temperature of a body being heated at one end is lower at a point spaced away from the source producing the temperature, because of the temperature gradient effecting heat flow, the temperature within the chambers 14 and 16 varies from the temperature of the chamber 15 where the chambers are contiguous to a temperature very much lower, approaching that of the surrounding atmosphere, adjacent the doors 35 and 36. Thus an article moving through the furnace 10 experiences three temperature phases, a rising temperature from approximately ambient to 2300 degrees Fahrenheit in the chamber 14, a constant temperature of 2300 degrees Fahrenheit in the chamber 15, and a decreasing temperature from 2300 degrees Fahrenheit to approximately ambient in the chamber 16.

In one type of heat-treating cycle the furnace chamber 10 is arranged to be used in the horizontal position as shown; and to produce variation of the temperature gradients inside of the chambers 14, 15 and 16 for other types of heat-treating cycles, the chamber 10 is pivoted or tilted from its normal horizontal position to an angular position such as the one shown by the dotted outline for example. This is accomplished by providing the pivoting framework 11 beneath the furnace chamber including the two spaced apart frames 37 and 38, each having a center support 39 and two end supports 40 and 41. The center supports 39 are attached beneath the heat-holding chamber 15, the end members 40 are attached beneath the outer end of the preheating chamber 14, and the end members 41 are attached beneath the outer end of the cooling chamber 16.

The center members 39 and the end members 40 and 41 at their lower ends form junctions having holes through which pivot pins 42 and 42a are received, the pivot pins in turn being received in openings in the floor-engaging plates 43 and 44. Thus the frames 37 and 38 pivoted to the floor plates 43 and 44 support the furnace 10 and allow pivoting thereof from one position to another.

The furnace chamber 10, supported by the pivoting frame 11 and tiltable from the horizontal position to some other position, is held in any of its positions by the frames 12 and 13, the frame 12 including a floor-engaging plate 45 and two vertical members 46 and 47 spaced apart a sufficient distance so as to receive the outer end of the preheating chamber 14 between them, as shown. Each of the vertical members 46 and 47 is provided with an opening through which a thumbscrew 52 is received to engage correspondingly threaded openings 48, 49 and 50 in the chamber 14. The threaded openings 48, 49 and 50 are formed in the chamber 14 on the circumference of a circle having the pivot pin 42 as a center so that in the tilted positions of the furnace the holes 48 and 50 come into registry with the thumbscrew 52. Similarly to the frame 12, the frame 13, co-operating with the outer end of the chamber 16, includes a floor-engaging plate 53 and two vertical members 54 and 55 spaced apart a sufficient distance so as to receive the chamber 16 between them. Each of the members 54 and 55 includes at its upper end an opening through which a thumbscrew 59 is received to engage correspondingly threaded openings 56, 57 and 58 in the chamber 16. The threaded openings 56, 57 and 58 are formed in the chamber 16 on the circumference of a circle having the pivot pin 42 as a center so that in the tilted position of the furnace the holes 56 and 58 come into registry with the thumbscrew 59. The vertical members 46, 47 and 54, 55 are of such height that when the thumbscrews 52 and 59 are in the openings 49 and 57 the furnace 10 is in the horizontal position. When the thumbscrews 52 and 59 are in the openings 48 and 58, respectively, the furnace chamber 10 is tilted with the chamber 14 higher than the chamber 16, and when the thumbscrews 52 and 59 are in the holes 50 and 56, respectively, the furnace 10 is tilted in the opposite direction so that the chamber 14 is lower than the chamber 16. Associated with the chamber 14 is an automatic regulating mechanism 60 to be more completely described subsequently in this specification.

With the construction of the furnace as thus far described and with the regulating mechanism removed or inoperative, the operation thereof is substantially as follows. It is assumed in the first instance that the vents 31 and 32 are open (the dampers 33 and 34 are open), that the furnace chamber 10 is in its horizontal position, so that the chambers 14 and 16 are at the same level, and the doors 35 and 36 are closed. It is also assumed that power is being supplied to the carbon resistors 24 and, as a result thereof the temperature in the chamber 15 is at the proper value. As already indicated the temperature in the chambers 14 and 16 is derived from the heat in the chamber 15 by radiation through the space in the chambers, by conduction through the walls of the refractory material 17 and by convection through the atmosphere within the chambers. Consequently, the temperature in the chamber 14 varies from a very low value adjacent the door 35 to a value approaching that within the chamber 15, and the temperature in the chamber 16 varies from a value substantially that in the chamber 15 to a very low value adjacent the door 36. The vents 31 and 32 are at the same height in the present assumption and there would be no tendency for air to circulate therethrough due to gravity, and consequently, there would be no substantial circulation of air through the furnace chambers. As a result very little heat is transferred from chamber 15 to chambers 14 and 16 by convection. Some leakage of course may occur around the doors, but this is sufficiently small so as to be negligible. Accordingly, the temperature gradient or variation in the chamber 14 is the same as that in the chamber 16 except that the former is increasing toward the chamber 15 and the latter is decreasing away from the chamber 15. The pyrometer 26 indicates the temperature within the chamber 15 and may be connected to control the heating circuit so that the temperature in this chamber 15 may be maintained at the desired value. Thus, when a group of articles on the tray 23 are placed in the furnace the articles will be heated and cooled in a cycle following the curve labeled $t_1$ in Fig. 4 which shows the variation of the temperature of the articles being treated during the time they are in the furnace. The articles come rapidly up to the entrance temperature of chamber 14 and since the tray 23 is pushed through the furnace by an attendant and may be moved a small amount at fixed regular intervals, the articles on the tray are exposed to the temperature in that portion of the furnace for a fixed length of time. When the end of chamber 16 is reached, the articles are removed therefrom and are cooled down from the exit temperature by the atmosphere to ambient temperature as shown by the dotted portion of the curve.

Therefore, the articles are preheated at a certain normal rate in the chamber 14 where the temperature is rising until the articles reach the chamber 15 where the maximum temperature is applied for a desired length of time, after which the truck 23 is pushed into the chamber 16 where the cooling cycle begins. While the maximum temperature is applied to the articles in chamber 15, the articles are being moved and do not come up to the maximum temperature but remain somewhat less since heat is being transferred to them, the amount depending on the length of time in chamber 15. The temperature at each point in the chamber 16, which is lower than in chamber 15 and is constantly decreasing, is of course applied to the articles on the truck 23, the articles assuming this temperature, and since the articles are pushed through the chamber in uniform intervals they are gradually cooled from the maximum temperature to a low exit temperature at a normal rate. The maximum furnace temperature, when the furnace is in a horizontal position, occurs in the center of chamber 15 and since heat is being transferred to chamber 16 the temperature at the junction of chambers 15 and 16 is less than the maximum. Thus treated articles begin to cool before reaching chamber 16 as shown by the curve. When the articles reach chamber 16 where there is no heat being supplied they cool off rapidly.

Assuming in a second instance that it is desired to heat-treat articles in a cycle beginning with a slow rate of preheating stage followed by a heat-holding stage and ending with a slow rate of cooling stage, the furnace chamber 10 is tilted so that the preheating chamber 14 is lower than the cooling chamber 16, such as by tilting the chamber 10 counterclockwise until the thumbscrews 52 and 59 are received in the openings 50 and 56. This cycle is exemplified by the curve $t_2$ of Fig. 4. The vents 31 and 32 are open (the dampers 33 and 34 are open) and air will circulate through the chamber 10, the air entering the vent 31 and leaving the vent 32 because of the difference in height of the ends of the chambers 14 and 16. This is a convection phenomenon. Gases or other fluids when heated tend to rise because of their decrease in specific gravity. Air in the chamber 10 is heated and tends to rise, and when the chamber 10 is tilted the air therein is given a pathway to flow in and flows from the lower end toward the higher end. The air entering the vent 31 is at ambient temperature or thereabouts and thus is considerably lower in temperature than exists inside of the chamber 14. Consequently, the temperature in the chamber 14 is reduced at its beginning and throughout its length by the incoming cold air. The air, in continuing its circulation, becomes heated to a higher temperature in the chamber 15, carries the heat it has acquired into the chamber 16, and consequently raises the temperature therein adjacent the point where the chamber 16 joins the chamber 15 over the temperature for this point for the horizontal operation, the heated air passing out of the vent 32. Since the circulating air is at a higher temperature than the temperature in chamber 16, the air is cooled in passing therethrough but it keeps the temperature in chamber 16 including that at the exit end at a value higher than for the normal horizontal operation. This becomes clear by recalling that the heat in chambers 14 and 16 is derived from the heat in chamber 15 by radiation, conduction and convection, and when the furnace is tilted convection comes actively into play.

The area of maximum temperature which, in the horizontal case of furnace operation, exists throughout a substantial portion of chamber 15 has been shifted farther away from the junction of chambers 14 and 15 and into the beginning portions of chamber 16. Thus the distance from the outer end of the chamber 14, where the cold air is coming in, to the area of maximum temperature has been lengthened somewhat. This plus the low entrance temperature in chamber 14 and the fact that the cool air is only gradually heated results in a low temperature gradient in chamber 14 or the rate of rise of temperature has been decreased over the horizontal case. Also the distance from the area of maximum temperature in the chambers 15 and 16 adjacent the junction of these chambers to the outer end of chamber 16 where the heated air goes out of the vent 32 has been shortened. However due to this heated air the exit temperature from chamber 16 is much higher than that for horizontal operation. As a result the articles in chamber 16 are subjected to a temperature varying from a high value to a value still high and hence are cooled at a low rate (i. e. low temperature gradient) even though the temperature variation takes place in a somewhat shorter distance than for normal operation. Consequently, articles on the tray 23 which are being pushed at uniform intervals through the furnace chambers are heated slowly in the chamber 14, have their temperature held at the desired level through a portion of the chamber 15 and the beginning portion of the chamber 16, followed by a slow cooling as the articles approach the door 36. The heated air prevents the articles from cooling until they are substantially at the junction of chambers 15 and 16 and then the cooling takes place somewhat more slowly until somewhat farther away from the junction as shown by curve $t_3$. The dotted portion of the curve beyond chamber 16 indicates the cooling in the atmosphere which ordinarily does not effect the properties of the articles. If this should be too rapid the articles may of course be transferred to another furnace for slower cooling.

Assuming in a third instance that it is desired to have a heat-treating cycle having a high rate of preheating, i. e., a rapid rise of temperature in chamber 14, and a rapid rate of cooling, i. e., a rapid decrease in temperature in chamber 16, the furnace 10 is tilted in the opposite direction so that the preheating chamber 14 is at a higher level than the cooling chamber 16, which is accomplished by tilting the chamber 10 clockwise and placing the thumbscrews 52 and 59 in the openings 48 and 58 (shown dotted). This cycle is exemplified by the curve $t_3$ in Fig. 4. In this position of the furnace, air circulates in through the vent 32 and out of the vent 31, due to its change in density and the fact that tilting the furnace provides a pathway for the air to flow in, reversing the direction of air flow given in the preceding example. The cold air flowing in the vent 32 cools the chamber 16 since the air is at ambient temperature, and therefore, is much below the temperature in chamber 16, and the cold air, continuing its flow, becomes heated in the chambers 16 and 15, passing therethrough and through the chamber 14. The cold air as it enters the chamber 15 cools this chamber below its maximum temperature adjacent where the chambers 16 and 15 meet and thus the distance in which the temperature rises from a low value at the vent 32 to its maximum value in the chamber 15 has been increased somewhat. However, since the air entering vent 32 reduces the exit temperature of chamber 16 to a value much below that for horizontal operation and the temperature in chamber 15 remains substantially the same as for horizontal operation, the temperature gradient (rate of cooling) has been increased. The heated air moving into chamber 14 of course raises the temperature therein throughout its length over that for horizontal operation, particularly where this chamber joins the chamber 15, and therefore, the area of maximum temperature which existed previously in the chamber 15 is shifted to also include the beginning portion of the chamber 14. The entrance to chamber 14 is therefore at a higher temperature and thus articles to be treated are subjected to a higher initial temperature. The distance in chamber 14 in which the temperature changes from the initial or entrance value to the maximum value is decreased. This plus the higher initial temperature effects an increased temperature gradient in chamber 14 over that existing therein during the normal horizontal operation of the furnace. Hence, when articles are moved through the furnace on the tray 23, these articles are subjected to a temperature which increases rapidly, and consequently, are preheated quickly.

In this instance of operation also the articles are pushed through the furnace on the trays 23 in steps at uniform intervals so that the articles are subjected to the temperature at regular intervals in the furnace. After the articles have been rapidly preheated in chamber 14, they are moved through the chamber 15 and are exposed to the desired maximum temperature for the necessary length of time. When the articles are moved into the chamber 16, they are subjected to the temperature in this chamber and are cooled over the somewhat greater distance from the area of maximum temperature to the exit of chamber 16. But the heated articles from chamber 15 are subjected to the cool air flowing in chamber 16 and are cooled to an exit temperature considerably below that existing for horizontal operation. Consequently the articles are cooled from a high value to a much lower value and hence are cooled at a rapid rate. The cold air contacting the articles near the end of chamber 15 begins to cool them slightly as shown by the curve and when the articles pass into chamber 16 away from the heating units of chamber 15 the cooling becomes more rapid. Thus the articles in this example of operation pass through a cycle beginning with rapid preheating phase, having a heat-holding phase, and ending with a rapid cooling phase (curve $t_3$, Fig. 4). The dotted portion of the curve indicates the cooling taking place in the atmosphere after the articles are removed from the furnace.

If it is found that when the furnace chamber 10 is tilted from the horizontal position and air is entering through either vent there may be a tendency for the temperature throughout the whole furnace to change because of the heat acquired by the cold air, an attendant may change the taps on the power supply transformers to supply sufficient voltage to the resistors 24 to supply sufficient heat to compensate for the change introduced by the flowing air.

The structure of the furnace and the manner of operation as thus far described have application when the furnace is operated manually and the regulating mechanism 60 is disconnected. The regulating mechanism 60 makes the furnace capable of automatic operation and comprises an expansible and contractible member 61 filled with a heat-responsive liquid, and a connecting or push rod 62. Attached rigidly to and extending downwardly from the lower side of the furnace chamber 14 is a projecting stub 63 having a circular slot 64 formed therein at the lower end thereof and a hole 65 connecting the slot with the end of the stub, the slot 64 continuing to the outside of the post 63 as shown. The expansible and contractible member 61 may consist of a series of bellows flanges, and projecting upwardly from the upper end thereof is an internally threaded post 66.

Extending between the stub 63 and the post 66 is the connecting or push rod 62. The push rod 62 has a central portion 67 which may be gripped by an individual to produce a desired setting and at the lower end of which there is a threaded portion 68 adapted to co-operate with the internal threads of the post 66. Projecting upwardly from the upper end of the gripping portion 67 is a circular flange 69 connected to the portion 67 by a reduced section 71. The flange 69 is of a size to fit easily into the circular slot 64, and the reduced section 71 is of a size to easily fit into the hole 65.

In order to assemble the push rod 62 to the regulating mechanism, the thumbscrews 52 and 59 are removed and the furnace chamber is tilted a sufficient distance so that the flange 69 may be placed within the slot 64 and the threaded portion 68 threaded into the post 66. If it is desired that the furnace be operated on curve $t_1$ of Fig. 5, the push rod 62 is turned so that the portion 68 is threaded into the post 66 a distance sufficient to hold the chamber 14 higher than the chamber 16 by the desired amount. If it is intended to operate the furnace in the horizontal position (curve $t_2$ of Fig. 5), the push rod 62 is rotated until the chamber 14 is at the same level with the chamber 16, and if the furnace is to be operated along the curve $t_3$ of Fig. 5 the push rod 62 is rotated still further until the chamber 14 is below the level of the chamber 16 by the necessary amount. With the thumbscrews 52 and 59 removed, the only force maintaining the furnace in the necessary position is that exerted by the bellows 61 and the push rod 62.

Extending from the lower end of the bellows 61 is a tube 72 connected with a temperature bulb (not shown) inside of the chamber 16, for example, the temperature bulb being influenced by the temperature therein. The tube 72 is also filled with the temperature responsive fluid which transmits the temperature from the temperature bulb to the fluid inside of the bellows 61. As the fluid increases or decreases in temperature, the bellows expand and contract, thereby keeping the furnace in a predetermined position. Thus, if the furnace is to operate in the horizontal position with a certain temperature in chamber 16 and the temperature in this chamber increases, the bellows 61 will expand to raise the chamber 14 and lower the chamber 16, thereby permitting air to enter vent 32 and cool the furnace. Similarly, if the temperature in chamber 16 decreases the bellows contract and the chamber 16 is raised permitting circulation of air in a vent 31 which increases the temperature in chamber 16 as already explained. In the event it is desired to regulate the position of the furnace according to the temperature inside of the chamber 15, the tube 72 may be connected to the tube 73 which is in turn connected to a temperature bulb (not shown) inside of the chamber 15.

Referring to Fig. 3, there is shown a modification of the furnace suitable for use with hydrogen controlled atmosphere or the like. When a controlled atmosphere is being used, it is necessary to seal all openings to the furnace to prevent air from leaking thereinto. To accomplish this the doors 35 and 36 tightly close, and suitable connections are provided to the vents 31 and 32 to supply the controlled atmosphere. Air is prevented from seeping into the furnace chamber and the controlled atmosphere is prevented from seeping out of the furnace chamber where the carbon rods 24 pass through the metal cover 19 by circular bellows 74 being placed around the exposed ends of the carbon rods 24 and welded or otherwise sealed to the metal cover 19. The outer end of the bellows 74 is closed by means of metallic plates 75 having sealed connections 28 for conductors 29 to thereby completely seal the furnace.

When the furnace is being used with a controlled atmosphere, the operation is substantially the same as when air is used. The gas constituting the atmosphere enters the furnace through either of the vents 31 or 32, or otherwise, and since the temperature of this gas is ordinarily at about ambient temperature the different temperature gradients within the furnace may be obtained by tilting the furnace chamber substantially, as already described. If it is intended that the furnace operate in the horizontal position and it is necessary to have the gas of the atmosphere circulate therethrough, the gas may be pumped through the vents 31 or 32 in any well known manner such as by a centrifugal pump (not shown).

Along with tilting the furnace chamber from the hoizontal and allowing gases whether air or otherwise to circulate through the vents 31 and 32 to effect a change in the temperature gradients existing within the furnace, it may be desirable to have the type of temperature gradient associated with a particular direction of tilt of the furnace, but with a somewhat different temperature variation. This temperature variation may be obtained by opening or closing the dampers 33 and 34 to vary the amount of gas flowing through the furnace chamber. Thus, if the dampers are completely open the maximum amount of air circulates, and consequently, the cooler is the end of the furnace chamber at which the air enters and closing the dampers decreases the amount of gas circulating, and hence, results in a lesser temperature change.

Increasing or decreasing the amount of air circulating will of course also vary the temperature within the chamber 15, and in this manner small temperature changes in the chamber 15 may be obtained without varying the connections to the power supply. Such small temperature changes may be indicated by a spirit level 76 attached to the furnace chamber 15 and calibrated in degrees. The bubble of the spirit level would be centered for the horizontal position and would move off to one side for a tilt of the furnace. Since the angle of tilt varies the amount of air circulating and hence the cooling of the furnace, the displacement of the bubble would give an indication of the temperature change.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Means for varying the temperature distribution in an elongated furnace having a normal position and closures at each end thereof comprising heating means arranged in said furnace intermediate the ends thereof, vent means at each end of said elongated furnace to provide a multichamber furnace whereby the direction of heat movement through said furnace may be changed by tilting thereof from one position to another, and means for tilting said furnace from said normal position.

2. Heat treating apparatus comprising an elongated chamber having a normal position, closures at each end of said chamber, heating means associated with said chamber intermediate the ends thereof for maintaining a temperature distribution in said chamber, gas inlet and outlet means adjacent each end of said chamber whereby convection currents may pass through said chamber for varying the temperature distribution therein, and means for displacing said chamber from said normal position in either direction to change the direction of heat movement through said furnace.

3. Heat treating apparatus comprising an elongated chamber having vent means at each end thereof to provide a continuous pathway for the circulation of gases therethrough, heating means centrally arranged in said chamber for producing a temperature distribution varying from a maximum value at the center of said chamber to a minimum value at the ends thereof, and means for tilting said chamber thereby to vary the circulation of gases therethrough to change said temperature distribution.

4. Heat treating apparatus comprising an elongated chamber having vent means at each end thereof to provide a continuous pathway for the circulation of gases therethrough, said chamber being adapted to be used in a substantially horizontal position, heating means centrally arranged in said chamber for producing a temperature distribution varying from a maximum value at the center of said chamber to a minimum value at the ends thereof, means for tiling said chamber to effect circulation of gases through said vent means and said chamber, and valve means associated with said vents for controlling the amount of circulating air.

5. Heat treating apparatus comprising an elongated chamber having vent means at each end thereof to provide a continuous pathway for the circulation of gases therethrough, heating means centrally arranged in said chamber, means for tilting said chamber to vary the circulation of gases therethrough, and temperature responsive means for operating said tilting means.

6. Heat treating apparatus comprising a preheating chamber, a heat holding chamber and a cooling chamber arranged in series, heating means associated with one of said chambers, supporting means for said chambers, pivot means associated with said supporting means whereby said chambers are tiltable from a horizontal position, and means for holding said chambers in any position.

7. Heat treating apparatus comprising a tiltable chamber having a preheating section, a heat holding section and a cooling section arranged in series, heating means in said heat holding section, supporting means for said chambers, pivot means associated with said supporting means whereby said chamber is tiltable to raise or lower said preheating section and correspondingly lower and raise said cooling portion, and means for holding said chamber in any position.

8. Heat treating apparatus comprising a tiltable chamber having a preheating section, a heat holding section and a cooling section arranged in series whereby material to be treated in said furnace is treated in three stages, heating means in said heat holding section whereby said preheating section and said cooling section derive heat therefrom, means for tilting said chamber whereby the temperatures in said preheating and said cooling sections are varied, and means for holding said chamber in a tilted position.

9. Heat treating apparatus comprising a tiltable chamber having a preheating section, a heat holding section and a cooling section arranged in series for treating material in three stages, heating means in said heat holding section whereby said preheating section and said cooling section derive heat therefrom, said preheating section including an opening and said cooling section including an opening for circulating gases through said chamber, means for tilting said chamber whereby gases circulate therethrough from said openings for varying the temperatures in said preheating and said cooling sections, and means for holding said chamber in any position.

10. Heat treating apparatus having three stages of operation comprising a tiltable chamber having a preheating section, a heat holding section and a cooling section arranged in series, guide means in said chamber for conveying material to be treated, heating means in said heat holding chamber whereby said preheating section and said cooling section derive heat therefrom, said preheating section having an opening and said cooling section having an opening for circulating gases through said chamber, means for tilting said chamber whereby gases circulate therethrough from said openings to vary the temperature in said preheating and said cooling sections, and means for holding said chamber in any position.

11. Heat treating apparatus having three stages of operation comprising a chamber having a preheating section, a heat holding section and a cooling section arranged in series, said chamber having a normal position, and means for displacing said chamber from said normal position.

12. Heat treating apparatus having three stages of operation comprising a chamber having a preheating section, a heat holding section and a cooling section arranged in series and adapted to be used in the horizontal position, heating means in said heat holding chamber, guide means in said chamber for conveying material to be treated therethrough, and means for varying the temperature in said preheating section and said cooling section comprising air inlet and outlet means associated with each of said preheating and cooling sections and means for tilting said chamber.

13. Heat treating apparatus for successively preheating, heat holding and cooling objects comprising a chamber having a preheating section, a heat holding section and a cooling section arranged in series, heating means in said heat holding section, said preheating chamber and said cooling chamber deriving heat from said heat holding section, and means for tilting said chamber.

14. A heat treating furnace comprising a tiltable body having a plurality of chambers therein, means for supplying heat to said chambers, means for causing said heat to circulate from one to the other chamber, and means for tilting said body to cause said circulating means to change the rate or the direction of movement of the heat through said chambers.

15. Heat treating apparatus comprising an elongated chamber having a normal position, closures at each end of said chamber, heating means associated with said chamber intermediate the ends thereof for maintaining a temperature distribution in said chamber, means for displacing said chamber from said normal position, gas inlet and outlet means adjacent each end of said chamber whereby convection currents of air pass through said chamber for varying the temperature distribution therein, and valve means in said inlet and outlet means.

WALTER C. HASSELHORN.

REFERENCES CITED

The following references are of record in the file of this patent:

UNITED STATES PATENTS

| Number | Name | Date |
|---|---|---|
| 1,671,546 | Romph | May 29, 1928 |
| 1,945,652 | Martin | Feb. 6, 1934 |
| 1,972,868 | Case | Sept. 11, 1934 |
| 2,233,474 | Dreffein | Mar. 4, 1941 |

FOREIGN PATENTS

| Number | Country | Date |
|---|---|---|
| 3,010 | Great Britain | Oct. 22, 1908 |
| 4,843 | Great Britain | Sept. 4, 1913 |